Dec. 17, 1929.                C. B. ROBERTS                1,739,861
                           GEOGRAPHICAL EDUCATOR
                             Filed Sept. 6, 1927
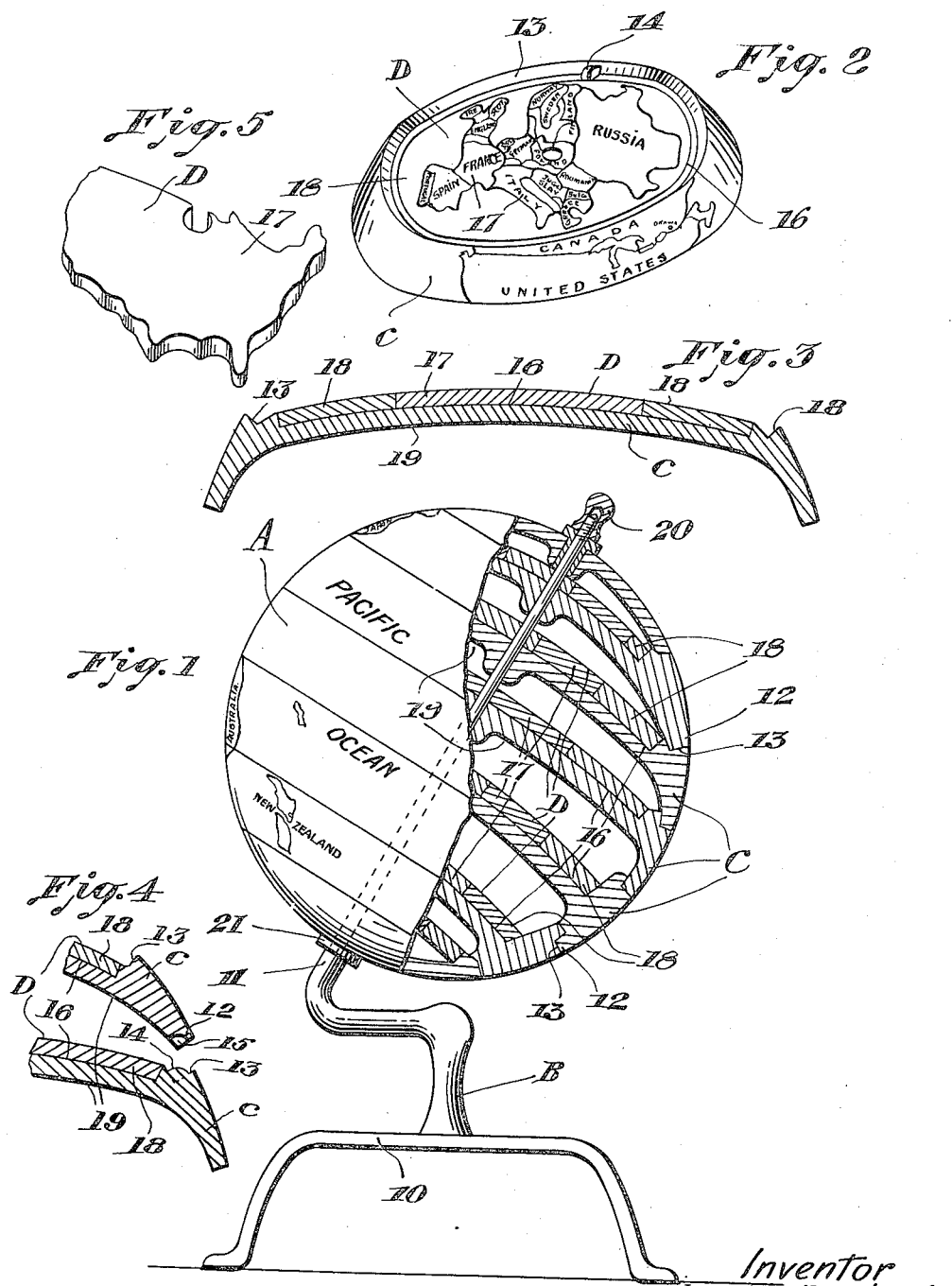
Inventor
Charles B. Roberts Patented Dec. 17, 1929

1,739,861

UNITED STATES PATENT OFFICE

CHARLES BEN ROBERTS, OF BROOKLYN, NEW YORK

GEOGRAPHICAL EDUCATOR

Application filed September 6, 1927. Serial No. 217,833.

This invention relates to improvements in geographical educators and the objects of the invention are to provide a simple device by which geographical knowledge may be imparted by means which will stimulate the interest of the child and impress on his mind the fundamental scientific principles of geography.

The invention relates more particularly to a sectional globe in which the sections contain segments representing different countries or geographical sub-divisions, and a more particular object of the invention is so to arrange these sections that the correct principles with regard to the curvature of the earth's surface may be communicated by the use thereof, and to enable the sections to be firmly held together to constitute the complete globe.

Further objects of the invention are generally to improve and simplify the construction of the device to enable it better to perform the functions required of it, and it consists essentially of the improved construction hereinafter set forth and described in detail in the accompanying specification and drawings.

In the drawings like characters of reference indicate corresponding parts in each figure.

In the drawings:

Fig. 1 is a sectional elevation of an embodiment of the invention.

Fig. 2 is a perspective view showing one of the sections.

Fig. 3 is a cross sectional view through one of the sections with the geographical segments therein.

Fig. 4 is a sectional detail showing the manner in which the sections fit together.

Fig. 5 is a perspective view of one of the geographical segments removed from the section which supports the same.

Referring to the drawings A indicates a globe or sphere as a whole made of any suitable material such as wood, pressed pulp or the like, and containing on its exterior surface a map of the world. The globe as a whole is supported from a suitable stand B comprising a supporting bracket 10 and a spindle or axis rod 11 set at its proper inclination to the vertical to correspond with the axis of the earth.

The globe A is formed in a plurality of interlocking sections C, each of which forms part of the periphery of the globe, the exterior line of division being parallel to the lines of latitude on the globe. These sections are designed to interlock with each other by means of peripheral flanges 12 on each section which fit within sockets 13 on the adjacent section, angular displacement being prevented by means of a projection or pin 14 provided in the socket 13 at one point therein and designed to fit in a suitable recess or socket 15 in the flange 12.

Each of the sections C is designed to support a map section D which fits into a suitable recess 16 in the upper surface of the member C. This map section is formed with removable map segments 17 and outer non-removable segments 18, the latter conveniently representing the ocean portions of the continents shown on the section D. The map segments 17 are of irregular shape and are divided on lines corresponding to the geographical sub-division shown on the portion of the map illustrated, one or more countries being shown in each section. The surface of the member C and the member D is curved or convexed to indicate the earth's curvature and to avoid contact between the central portion of adjacent sections the lower part of each section C is recessed as at 19 so that it will be free from the curved section immediately below it. The curved surfaces of each of the sections are substantially parallel to each other as shown in Figure 1. All of the segments may be conveniently retained on the spindle 11 by means of a cap nut 20 which engages the threaded extremity of the spindle and holds the section against a flange 21 provided at the bottom of the spindle.

The various segments 17 may be formed of jig-saw pieces or of pieces specially molded to shapes corresponding with the geographical sub-divisions.

From the foregoing it will be seen that the globe carries on its exterior a map or representation of the countries of the world, their boundaries, the seas, lines of latitude and longitude, in fact everything ordinarily found on a map. The interior sections contain on their outer surface maps of individual countries or portions of maps and the segments fitted within the inner sections also have suitable indicia geographical or otherwise thereon. The globe can also be constructed to be supported without the use of the spindles.

It will be seen that owing to the curved formation of the sections the child using the device will naturally associate curvature with the map surfaces which he is studying.

As many changes could be made in the above construction and many apparently widely different embodiments of my invention employed within the scope of the claims constructed without departing from the spirit or scope thereof, it is intended that all matter contained in the accompanying specifications and drawings shall be interpreted as illustrative and not in a limiting sense.

What I claim as my invention is:

1. A geographical educator comprising a globe formed of a plurality of interlocking sections cooperating to form the periphery of the globe, each section having a concave face, and map sections comprising fixed and movable portions adapted to be set in said face.

2. The device as claimed in claim 1 in which means are provided to prevent angular displacement of the sections.

3. The device as claimed in claim 1 in which the under portion of each section is recessed.

4. The device as claimed in claim 1 in which the lines dividing the sections are parallel to each other from the top to the bottom of the globe.

5. A geographical educator as claimed in claim 1 in which the globe sections are formed to interlock with each other at their outer rims.

6. A geographical educator as claimed in claim 1 in which the surfaces of the map sections associated with the globe sections are of substantially the same curvature.

7. A geographical educator comprising a globe formed of a plurality of interlocking sections each having curved recessed faces, a map section set in the recessed face and comprising outer fixed portions and inner removable portions provided on lines corresponding to the geographical subdivisions.

In witness whereof I have hereunto set my hand.

CHARLES BEN ROBERTS.